G. W. DONNING.
INTERNAL COMBUSTION ENGINE.
APPLICATION FILED SEPT. 14, 1912.
1,237,312.  Patented Aug. 21, 1917.
4 SHEETS—SHEET 3.
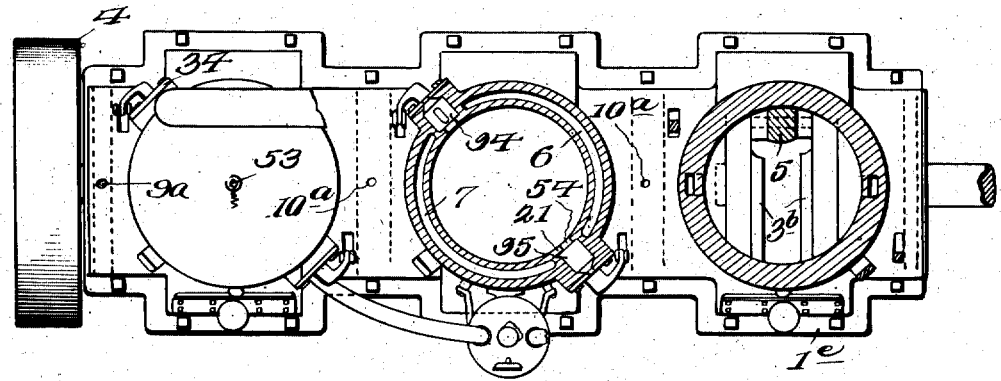
Fig. 3.
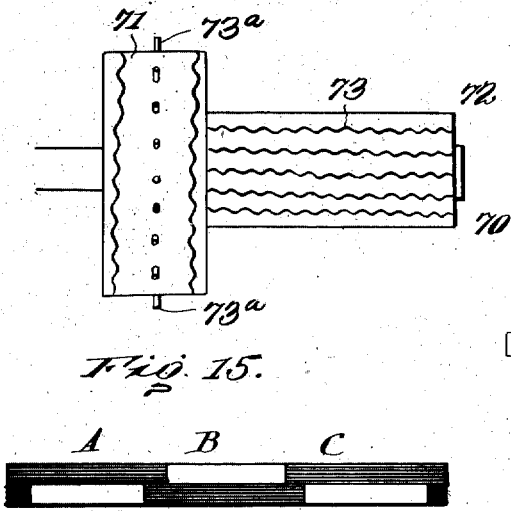
Fig. 13.
Fig. 15.
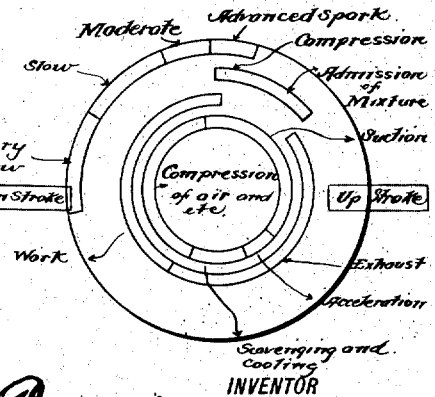
Fig. 14.
WITNESSES:
Frank A. Kane
G. M. Copenhaver
INVENTOR
George W. Donning
BY
Edmund H. Parry
ATTORNEY G. W. DONNING.
INTERNAL COMBUSTION ENGINE.
APPLICATION FILED SEPT. 14, 1912.
1,237,312.
Patented Aug. 21, 1917.
4 SHEETS—SHEET 4.
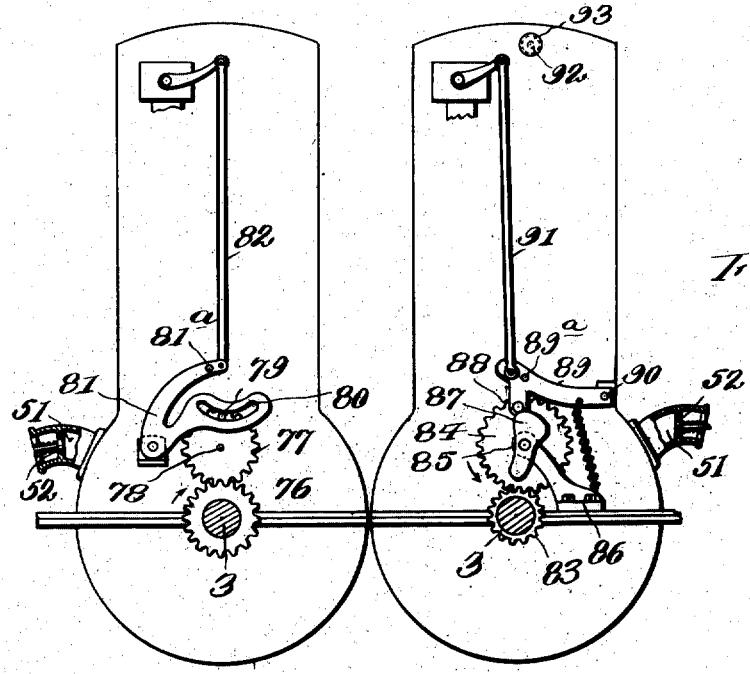
Fig. 6.
Fig. 5.
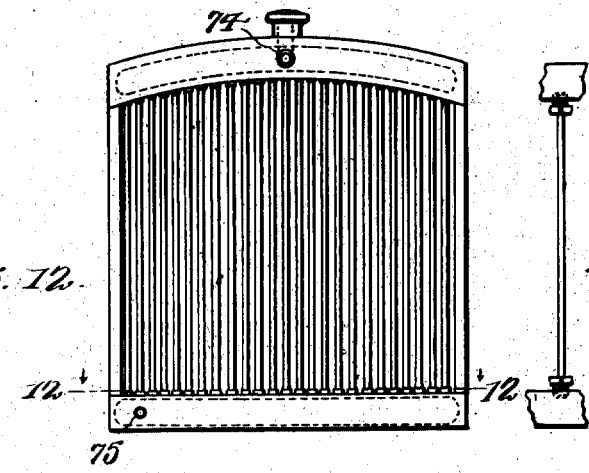
Fig. 12.
Fig. 12.ᵃ
Fig. 12.ᵇ
WITNESSES:
Frank A. Kane
INVENTOR
George W. Donning
BY
Edmund H. Parry
ATTORNEY

UNITED STATES PATENT OFFICE.

GEORGE W. DONNING, OF STAMFORD, CONNECTICUT.

INTERNAL-COMBUSTION ENGINE.

1,237,312.   Specification of Letters Patent.   Patented Aug. 21, 1917.

Application filed September 14, 1912. Serial No. 720,439.

*To all whom it may concern:*

Be it known that I, GEORGE W. DONNING, a citizen of the United States, residing at Stamford, in the county of Fairfield and State of Connecticut, have invented certain new and useful Improvements in Internal-Combustion Engines, of which the following is a specification, reference being had therein to the accompanying drawing.

This invention relates to internal combustion engines, generally, and, more specifically, to the two-cycle type thereof.

The invention has several important objects in view, among which may be mentioned that of constructing an engine which embodies all of the desirable features of the two-cycle and four-cycle engines and which, yet, eliminates most if not all of the known defects and objections inherently existing in each of these types of engines; and this contemplates the introduction of certain novel features to increase the power and efficiency of the engine, and whereby use of a great variety of fuels is permitted and economy in fuel and reduction of noise and friction in use, and the reduction in weight and size and number of parts of the structure, are effected.

A further object is to obtain a maximum of power with a minimum of weight and size of the parts and of the use of fuel.

Another object is to design an engine so that the parts thereof are accessible and easily removed.

Another object is to so construct the parts as to make the engine non-reversible and, also, practically "fool-proof."

A further object is to construct the various parts of the engine so that they are interchangeable.

Another object is to construct the engine so that it may include cooling and scavenging means and a suction stroke during the exhaust; an air compression stroke during the work stroke; and a gas forming or mixing operation during the work stroke.

Another object is to so operate the parts as to avoid a full suction stroke and a compression stroke within the firing-chamber.

Another object is to provide a chamber for compressing pure air for the purpose of effecting a more perfect scavenging and cooling of the firing-chamber after each work stroke and, thus, clear said chamber for the reception of a new mixture and, in consequence, prevent contamination of the new mixture with the old charge.

With these and other objects in view, the invention resides, in one aspect, in a structure comprising a cylinder, a piston, and a crank-shaft operating therein; the cylinder being provided with explosion and air compression chambers at opposite sides of the piston—the compression chamber being adapted to receive atmospheric air only; there being a channel or channels leading from the compression chamber to the lower portion of the firing-chamber, said channel or channels (mouthing into the firing-chamber) being adapted to be uncovered by the piston at the end of each work stroke which it performs; a combined carbureter and mixture-conveyer outside of the cylinder and which is dependent upon compressed air to produce and effect movement of the mixture therefrom into the firing-chamber; and a positively-driven valve-mechanism adapted to have an accelerated movement, and to be cooled and oiled, and running practically noiselessly.

The invention resides also in the novel form and aggroupment of the parts, the predetermined timing of operation of the movable element thereof, etc., all as hereinafter more fully described and claimed.

In the accompanying drawings, I have illustrated but one of many possible embodiments of my invention. It is to be understood that the principles and salient features of the invention are capable of being embodied in various other forms of structure and still be within the spirit of the invention.

In the drawings:

Fig. 3 is a view, partly in plan, and partly in horizontal section, the section being taken on the line 2—2, Fig. 2;

Fig. 4 is a fragmentary view of one form of the valve-operating mechanism, etc.;

Figs. 5 and 6 are views in elevation, partly in section, of modified forms of valve-operating mechanism; Fig. 5 in this instance showing a preferred form well adapted for a two-cycle engine; and Fig. 6 showing a preferred form well adapted for a four-cycle engine, and showing, also, the same as applied to the exhaust-valve;

Fig. 7 is a detail view, partly in section, showing the device for taking up wear and preventing leakage of gas at the valves;

Fig. 8 is a top plan view thereof;

Fig. 9 is a view in perspective, partly in section, of a modified form of wear take-up structure;

Fig. 10 is a vertical section, on an enlarged scale, of one of the valves;

Fig. 11 is a similar view of the combined mixture-making and storage-chamber, and wherein throttling is effected; the wire mesh being shown as provided in the lower portion of the chamber;

Figure 1:
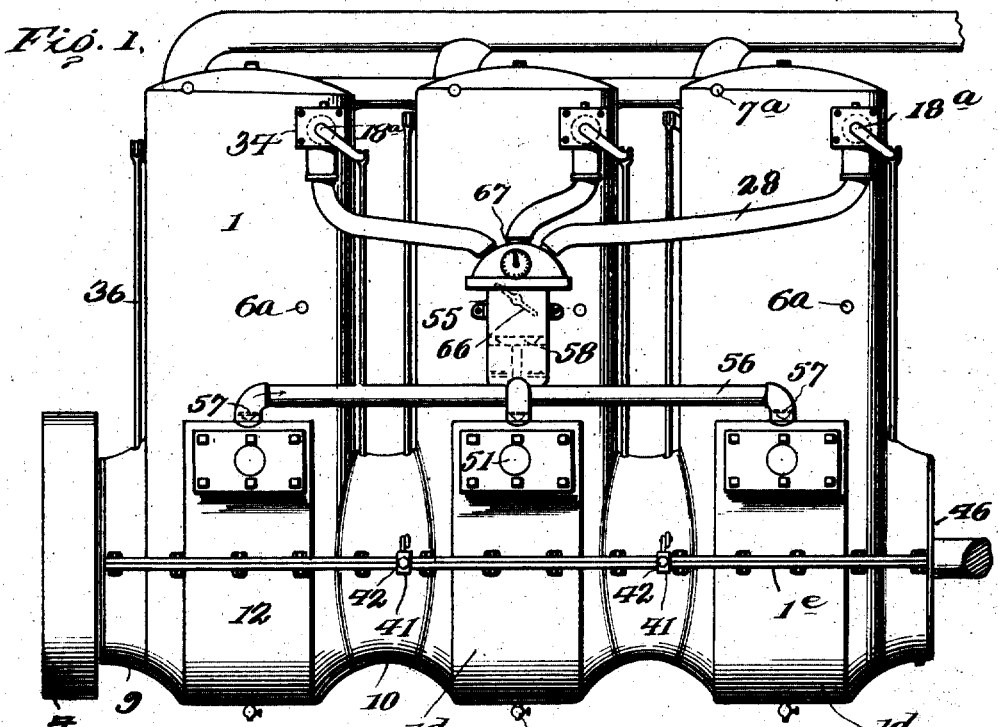
Figure 1 is a view in front elevation showing the cylinder-casing, with practically all the parts housed within the same.

Figs. 12, 12ª and 12ᵇ are views, respectively, in front elevation, vertical section, and horizontal section—the latter being taken on the line 12—12, Fig. 12—of the water-cooling radiator which includes tubes arranged in staggered relation;

Fig. 13 is a similar view; in this instance, the two chambers being shown as forming a primary chamber and a gas-splitting chamber of an improved form of muffler;

Fig. 14 is a diagrammatic view showing the relative points of the timed operations of the various parts on each side of the piston during a complete cycle or revolution of the crank-shaft of the engine; and Fig. 15 is a diagrammatic view, also, wherein the "power stream," that is, the available developed force or energy is shown as overlapping and occurring where a three-cylinder structure is utilized.

Referring to the drawings, it will be seen that the structure includes various parts which will now be described in detail:

The numeral 1 designates a cylinder-casing which, in this instance, is preferably cast in one piece with provision of means for cooling the same and supporting and oiling the parts, etc.; 2 designates a piston adapted to move in the cylinder; 3, a crank-shaft; 4, a fly-wheel thereon; and 5, a pitman connecting the piston with the crank-shaft. The cylinder is, as usual, provided with walls 1ª, and a top 1ᵇ, and with spaces 6 and 7 separated by spacers 8 and provided, thus, with channels for, respectively, water and air. The water-channels 6 preferably extend at least as far down the sides of the cylinder as the piston-head (presently to be described) is adapted to move. The air-channel or channels preferably extend from the crank-case (presently to be described) to a point just above the piston while the latter is in its lowermost position. The water-channels, aforementioned, are provided with inlet and outlet ports 6ª and 7ª for the purpose of circulation, etc.

As clearly shown in Figs. 1 and 3, the base portion 1ᵈ of the cylinder is provided with a flange 1ᵉ for securing the cylinder to the crank-case, presently to be described.

Figure 2:
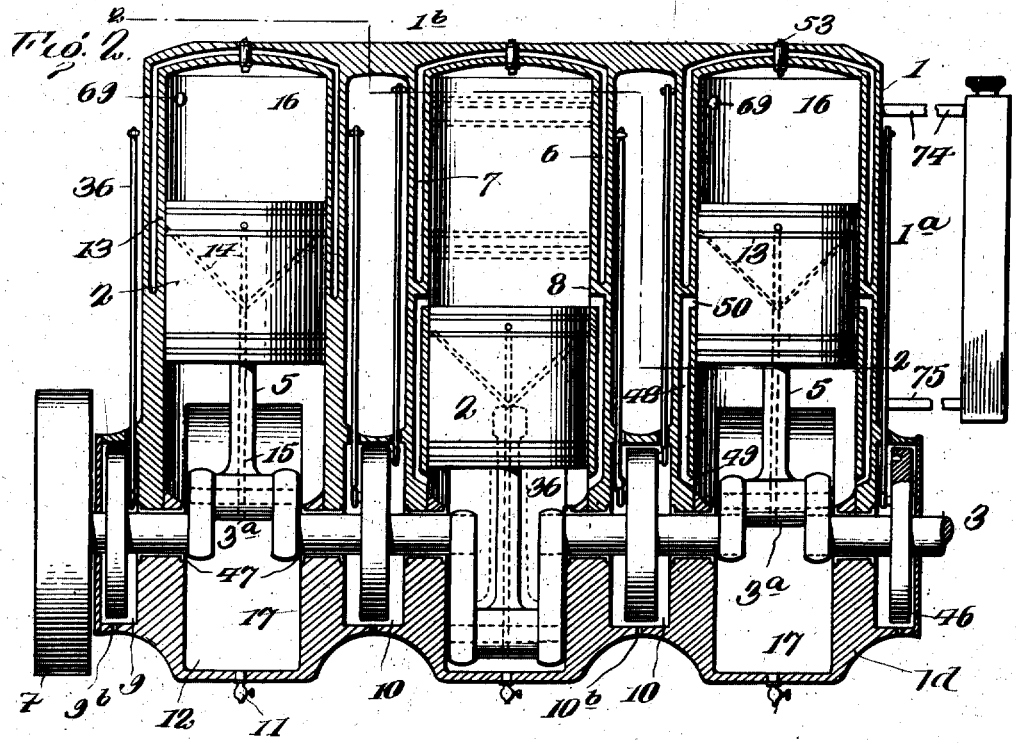
Fig. 2 is a view, partly in vertical section, illustrative of my invention as embodied in a three-cylinder structure; the cranks, in this instance, being shown as placed at practically 120° apart.

In Figs. 1 to 3, inclusive, the cylinders are shown as provided, on the sides, with casings 9 and 10, respectively, and in which are housed the valve-operating mechanisms (presently to be described) in order that these may be made practically dust-proof and noiseless and operate continuously in a suitable lubricating medium. The top, 1ᵇ, of the casing may be made removable.

As shown in Fig. 2, the bottom of each cylinder-casing is provided with a pet cock 11 whereby said casing may be drained.

The cylinder-casing is enlarged, at its lower portion, to provide a chamber or crank-case 12, which is of sufficient dimensions to accommodate the crank 3ª. This crank-case is also utilized as an air-chamber, in a manner presently to be described. It might also be employed as a mixture-chamber and be within the principles of my invention.

The piston 2, aforementioned, is preferably provided with expansion rings 13, as usual, and also with oil-conducting channels 14 for the purpose of lubricating the connection between the piston and the pitman. It is proper to state, here, that the piston is not only adapted to control a plurality of ports (presently to be described) opening into the cylinder; but it is adapted to perform a plurality of functions at its opposite ends during a complete revolution and, thus, a single cycle of movement, of the crank-shaft.

The pitman which connects the piston and the crank-shaft is preferably provided with a central oil-duct 15 adapted to supply lubricant to the connecting portion of the pitman with the crank-shaft.

As will be seen particularly in Fig. 1, the crank-members 3ᵇ, forming a part of the crank, will be of sufficient dimensions to constitute a filler of the space within which they move; but they are also of a predetermined weight in order that they may aid to effect a more perfect mechanical balance of the piston which connects with the shaft. By reason of the fact that the crank includes the two side members 3ᵇ, it is obvious that, in employing the so-called "splash" system of lubrication, these members provide a double media for dipping into the lubricant and throwing the same off and onto the parts requiring lubrication, during each revolution of the shaft.

It is a feature of my invention that the cylinder-casing includes a plurality of chambers, and these are provided by so forming the cylinder that the piston divides it into a firing-chamber 16 and into a compression chamber 17. Manifestly, by reason of the reciprocatory movement of the piston in the cylinder, these chambers are alternately elongated. I prefer to form the crank-case of relatively small dimensions in order that I may obtain a somewhat greater compression therein than can be effected in the ordinary form of crank-case. The interior dimensions of the crank-case may be varied by the inclusion or omission of the space fillers, already referred to; and I may also utilize any other means, whenever necessary, to change the working area of the crank-case to effect an increased or reduced compressive action therein. Such means may include the lubricant which is disposed in the crank-case, and the addition or reduction of which obviously will correspondingly reduce or increase the working space in the crank-case. If either alcohol or kerosene is employed as a fuel for the engine, a higher compression and higher temperature are required.

It is to be understood that I may employ as many cylinders as desired. In each instance, however, the cylinders and crank-cases are so designed as to be independent.

To control, in a positive and certain manner, the supply of charge to the firing-chamber, the displacement therefrom of the gases produced by ignition of the charge, etc., etc., I propose to use a series of controlling devices which are so connected to the crank-shaft that their operation is not only predetermined relatively, but their action is rendered absolutely positive in order that they may perform their functions in proper relation to the operation of other parts of the engine.

Various forms of these controlling devices may be employed and, in the drawings, I have illustrated different forms thereof. In Fig. 10, I have shown, on an enlarged scale, a form of valve 18 which is of exceedingly simple construction and yet is an effective type of controlling device which I elect to use. In Fig. 3, the particular locations of this valve are revealed: This valve comprises a tubular member, closed at one end and carrying a stem 18$^a$, and having an elongated aperture 18$^b$ extending longitudinally in the walls of the tube. If desirable, the valve may be provided with a plurality of circumferential grooves 18$^c$ adapted to receive one or more expansion rings 18$^d$. Encompassing the stem 18$^a$ and adapted to take up wear that may occur during a long continued operation of the valve, a washer 19, preferably cup-shaped, may be used. These valves 18 are adapted to be disposed in a valve-orifice 20 formed in the walls of the cylinder-casing, and provided with an abutment 21 which is formed by making the inner end of the orifice of less diameter than the bore of the orifice itself, as shown in Figs. 3 and 7. This abutment limits the rearward movement of the valve 18 and also provides means for preventing leakage around the outer surface of the valve. This construction also permits a film of oil to be maintained around the valve to insure its easy action and also to prevent leakage.

Formed in the casing beneath the valve-orifice 20 is a recess 22 in which is seated a spring-controlled T-shaped valve-tightening member 23, preferably encircled by an expansion ring 24. The T-shaped member is provided with a bore 25 extending its entire length. The T-shaped portion of the member is formed with a concaved depression 26 adapted to operatively register with the aperture 18$^b$ in the valve 18.

The wall 22$^a$ surrounding the recess 22 is provided on its outer edge 22$^b$ with screw-threads, upon which is to be secured a coupling-member 27 adapted to hold the extremity of a pipe 28, the end of which is enlarged and provided with an annular incut 28$^a$ into which the T-shaped member 23 is adapted to be seated normally. It will be understood that the enlarged end of the pipe 28 permits the coupling-member 27 to tightly engage the same and prevent leakage. Encircling the T-shaped member 23 and adapted to bear against the end of the pipe 28 is a spring 29, said spring also bearing against the ring 24 or some portion of the body-portion of the T-shaped member. The function of this spring is to maintain the T-shaped member tightly in engagement with the outer face of the valve 18, and it also tends to force the end of the pipe 28 into tight engagement with the coupling-member 27. By this means, a tight joint is formed and, in the event of any wear, the parts are self-adjusting to take up such wear and insure a tight joint.

It will be understood that the passage of the fluid or gas, whichever it may be, enters the valve and passes through the aperture 18$^a$, thence through the bore 25 of the T-shaped member, and thence into the pipe 28, from which it is led to any desired point. If, however, the valve is in a location where the fluid is passing into the cylinder, the path of travel is through the pipe 28, and thence through the bore 25 into the valve. In the first instance, the depression 26 in the T-shaped member tends more readily to direct the gas into the bore 25; whereas, in the latter instance, it permits the gas to separate out somewhat while entering the valve 18.

In lieu of the construction disclosed in Figs. 7 and 8, I may employ a modified form of construction illustrated in Fig. 9, which contemplates the omission of the T-shaped member 23 and the employment, in conjunction with the valve 18, of a different form of wear take-up. In this instance, the valve-orifice is provided with an arcuate cut-out 30 in which is seated an appropriately formed take-up member 31 provided on its outer edge with a feather 32 adapted to be seated in a groove 33 formed in the cylinder-casing. In this instance, the recess 22 is retained but is unobstructed by any intermediate instrumentality.

Adapted to be secured to the exterior of the cylinder-casing and to overlie the recess 22, is a plate 34 provided with an aperture 35 through which the stem $18^a$ of the valve 18 extends. This plate is adapted to press against the washer 19 and, thereby, maintain the valve in proper operative position against the abutment 21, already described.

Means are provided for actuating the valves and, preferably, such means include a connecting rod 36 operatively connected at one end to the valve-stem $18^a$ and at its opposite end to a lever 37 suitably pivoted upon a post or standard 38, and provided with a roller-carrying stud 39 adapted to traverse a groove 40 in a cam-disk 41 fast on the crank-shaft. Preferably and as shown, the post 38 is carried by a movable support $41^a$ mounted on a suitable part of the cylinder-casing, the position of which may be controlled by an adjusting instrumentality, such as a screw 42. By the adjustment of the post 38, the position of the roller-carrying stud may be changed and, in this manner, the time of movement of the connecting rod and, thus, of the valve to which it is connected, is varied. The lever 37 is provided with a plurality of holes $37^a$ into one or another of which the connecting rod is secured, and, by this means, the length of movement of the connecting rod is varied and, thus, the movement of the valve.

It is to be understood that the construction just described may be used in connection with any of the valves employed in my engine.

Preferably and as shown, the cam-disk 41 is provided, also, on its opposite side with a cam-groove 43 in which a roller-carrying stud 44 is adapted to travel, as shown in Fig. 4. The stud 44 is carried by a lever 45, preferably of construction and operation similar to that of the lever 37. For purposes presently to be explained, the cam-grooves 40 and 43 are of different formation; but their general function is the same, namely, to effect a positive and certain movement of their respective connecting rods and, thus, of the valves to which the respective connecting rods are attached. These instrumentalities effect a rotative movement of the valves in the valve-orifices, already described, and are thereby housed in such manner that the valves are adapted to be operated, preferably, in a film of lubricant constantly. Moreover, in being housed in close proximity to the cooling-channels or spaces of the cylinder, they are also kept cool in a very desirable manner and for an obviously good reason. Practical observation has shown that, in engine structures with which I am familiar, the valves become heated and, as a consequence, become less effective. By maintaining them in a film of oil and keeping them cool, they are effective always.

The disks 41, where they are disposed between two cylinders, are provided with double cams, whereas, when they are not so arranged, they preferably carry but a single cam.

Preferably and as shown, these disks are adapted to be housed within the casings 9 and 10, respectively, and in which, as already stated, a suitable lubricant may be employed in order to permit the disks to run continuously, if desired, in an oil bath. This lubricant may be introduced through orifices $9^a$ and $10^a$, and may be removed therefrom through the orifices $9^b$ and $10^b$. The side casings 9 are closed by a plate 46 through which the crank-shaft extends.

Preferably and as shown in Fig. 2, Babbitt metal bearings 47 are provided in the casing for the crank-shaft. These bearings are, as shown, formed in two parts and, being provided with flanges, interlock with the casing so that they are maintained in position against displacement by any lateral movement of the crank-shaft or by the action of compressed air which is introduced into the air or compression-chamber 12.

Preferably, and as shown in Figs. 2 and 3, the side walls of one or more of the cylinder-casings are provided with channels 48 having ports 49 and 50 adapted to be controlled by the movement and position of the piston 2 as the same reciprocates: Air having been introduced into the chamber 12—in the manner presently to be described—the same will be caused to pass from said chamber up into the lower portion of the ignition chamber through the channel 48, the condition of the piston in relation to the ports 49 and 50 controlling the movement of the air from the one chamber into the other. The purpose of introducing compressed air into the ignition chamber, at its lower portion, is to provide a medium therein which will be adapted to displace from the ignition chamber all of the charge that may not have been otherwise removed therefrom through the exhaust-ports. A further function of the air is to cool the ignition chamber and the piston. A still further function of the air is to provide an additional amount of air within the ignition chamber, and of the purest quality, to mix with the charge subsequently introduced into and ignited in this ignition chamber. Thus a smaller amount of the mixture is required for the explosion to operate the piston and, moreover, being uncontaminated by any residual gas that would have remained in the ignition chamber if it had not been properly scavenged by this air, a more efficient power stroke is developed.

It is generally recognized that the use of a muffler produces a resistance to the proper exhaust of the spent gases from the ignition chamber. By reason of the fact, however, that I introduce air into the ignition chamber at a pressure in excess of this resistance produced by the muffler, I am enabled to clear the ignition chamber of every particle of the unspent gases. By reason of this fact, it is evident that much of the carbonaceous matter that would otherwise adhere to the parts with which it comes in contact is not developed to the degree usual; but that which is formed is largely if not entirely blown out through the exhaust.

It is now in order to describe the means for introducing the air into the chamber 12: This chamber is provided with one or more apertures 51 controlled by a self-acting valve 52. The chamber being normally closed, the upward movement of the piston produces a vacuum in the chamber 12 and this opens the valve 52 to permit the inflow of atmospheric air in sufficient quantity to satisfy the vacuum. The descending movement of the piston effects a compression of the air thus introduced into the chamber and the valve 52 is thus automatically closed, whereupon the compressive action on the air is continuous and is completed so that, as the piston uncovers the port 50, the greater portion of the compressed air, thus produced, passes through the channel 48 and into the ignition chamber, as already described.

The charge, having been introduced into the firing or ignition chamber 16 is ignited by means of an igniting device 53 which may be of any appropriate form and timed to produce a spark at any predetermined time in relation to the position of the piston.

The charge is introduced into the firing-chamber through the inlet-port 54 (Fig. 3) which is controlled by a form of valve, like 18, already described. Each of the cylinders, if more than one is employed, is provided with one of these inlet-ports; and into each port extends the pipe or conduit 28 leading from a carbureter 55 which, in this instance, includes a closed casing from which extends, preferably from its lower end, another conduit 56 leading into each compression chamber 12 and in which conduit is arranged one or more valves 57 preferably like the valve 52, shown in Fig. 6. The carbureter is shown in detail in Fig. 11; and, besides including the casing 55ª, is divided by a spring-controlled valve 58 which divides the casing into two chambers 59 and 60, one of which chambers, 59, is a mixing chamber, while the other, 60, is a liquid-receiving chamber. Fuel is introduced into the carbureter through the nozzle 61, controlled by the inlet-valve 62, in the usual manner. Air is introduced into the chamber 60 through the port 63, into which the conduit 56 leads, and which is adapted to supply that portion of the air to the carbureter which is not withdrawn from the compression chamber and introduced into the ignition chamber, as already described. The air is thus supplied from the combustion chamber before the other portion thereof is permitted to pass into the ignition chamber. This air, thus introduced into the carbureter, is compressed and thus operates to open the valve 58 so that it and the fuel can enter the mixing chamber 59 to be mixed therein. Practical use of carbureters has shown that, at times, during introduction of the fuel, it does not "spatter" properly and in the proper direction. With a view to augmenting the "spattering" action within the carbureter, I provide the valve 58 with a pendant baffling element 64. Overlying the valve 58 is a reticulated element 65, preferably in the form of wire mesh, the function of which is to further comminute the materials passing into the mixing chamber, wherefore their admixture may be more readily accomplished. Housed within the casing 55ª is a throttle element 66 for throttling the gas, as usual.

It will now be understood, from the foregoing, that the fuel, having entered the carbureter and been thoroughly and well mixed, and therein "ripened", a portion thereof passes through the conduit 21 into the ignition chamber and there exploded, as already described.

In order that the operator may determine the exact pressure of the mixture within the carbureter, so that its rising above the point of effecting spontaneous combustion may be prevented, I provide a gage 67, of any appropriate form, and which is operated by the gas pressure within the carbureter in a manner that will be understood. If the operator observes that the mixture is rising to a dangerous point—and as it is undesirable to permit a waste of the mixture by permitting it to pass into the ignition chamber and be consumed therein without desirable result, and which condition of affairs would indicate that the compression in the chamber 12 is running too high,—the operator may increase the working space of the chamber 12 by withdrawing, through the pet cock 11, any desired amount of the fluid contained in the bottom of the chamber 12.

As the compressed air, which is naturally of relatively high temperature, passes through the chamber 60, and, thus, comes in contact with any portion of the fuel that may not have passed into the chamber 59. In this way, all of the fuel which is introduced into the carbureter is utilized, instead of a portion of it being wasted, as frequently now occurs. As the gas or liquid might back-flow from the carbureter, if means were not provided to prevent the same, I may rely upon the valves 57 to control this.

To drain the carbureter of any liquid or mixture which may be in the chamber 60—if it be necessary to make repairs, etc.—a cock 68 is provided, preferably, in the bottom of the carbureter.

Arranged in any suitable portion of the ignition chamber is an exhaust-port 69, as usual, and this is controlled by any appropriate form of valve but preferably one like that illustrated in Fig. 10.

Operatively communicating with each exhaust-port is a muffler 70, which may be of any desired form; but I may elect to employ one like that designated 70 in Fig. 13. In this instance, the muffler-casing is divided into two chambers 71 and 72, and which I shall herein refer to as, respectively, the expansion chamber and the muffling chamber. Preferably and as shown, the muffler-casing is surrounded by one or more cooling flanges 73. If desired, outstanding pins or projections 73ª may be employed. The function of these is to radiate the heat of the exhaust-gases, resulting in a cooling of the temperature of the exhaust gases and, thus, cool the chamber and thereby reduce the heat-units contained therein. This provides a method for cooling the exhaust-gases within the muffler-casing, so that a smaller and simpler form of muffler may be employed. This rapid cooling, acting in conjunction with the chamber itself, in advance of the muffler, reduces back-pressure upon the piston during each exhaust-stroke of the engine. It has been found, on practical operation, that the ordinary form of muffler that is adapted completely to silence the exhaust-noise, produces a back-pressure of the gases into the ignition chamber and against the piston. To provide a receptacle into which these gases may pass and, thus, prevent such back-pressure of the gases, the muffler is provided with an expansion chamber 71. This enables me to dispense with the muffler "cut-out", so-called, which is used to relieve the pressure within the ignition chamber of the gases acting on the piston as it rises during the exhaust-stroke, as is well understood. I obtain practically the equivalent result of a muffler cut-out by releasing the gas from the ignition chamber into the expansion chamber and such gas may be permitted to escape therefrom at any time, irrespective of the position of the piston. I thereby effect a complete silencing of the noise without the objectionable disadvantages already pointed out of the muffler back-pressure. In addition, by eliminating this muffler back-pressure against the piston, the volume of the unexhausted compressed gases that remain within the firing-chamber at the time the exhaust-valve is closed, is greatly reduced, so that when the piston begins its suction stroke it almost immediately begins to draw in the mixture and with superior results since there is less of the foul matter remaining to expand and contaminate said mixture.

In view of the fact that, in my structure, the gases are exhausted more rapidly than usual, and in view of the fact, also, that air-cooling facilities are incorporated, and more particularly, in view of the fact that I am enabled to reduce the number of cylinders (without reducing the power-producing capacity of the engine) and, thus, reduce correspondingly the weight and space occupied by the engine, I can employ any appropriate form of radiator for cooling the water; but I may, if desired, utilize a tubular radiator like that illustrated in Figs. 2 and 12, which may be connected to the engine by the pipes 74 and 75. Having reduced the weight and space, as aforementioned, I am enabled to correspondingly increase the water-storage facilities.

While I have herein exemplified certain embodiments of my invention, it nevertheless is to be understood that the various parts and mechanisms may be modified to a considerable degree and yet be within the spirit of my invention.

For instance, in lieu of the form of valve-operating mechanism already described, I may, for a two-cycle engine, for example, utilize the form shown in Fig. 5, which contemplates the mounting of a pinion 76 on the crank-shaft 3. Adapted to mesh with this pinion is a corresponding pinion 77 carried by a stub-shaft 78 journaled in any suitable part of the engine and provided with a roller-carrying stud 79 adapted to travel back and forth in a cam-slot 80 formed in one end of a bell-crank-lever 81 pivoted to any suitable part of the engine. The lever is also attached to a connecting-rod 82, corresponding to the rod 36. To permit a greater or less movement of the valve (to which the connecting-rod 82 is attached), the lever 81 is provided with a series of holes 81ª in one or another of which the connecting-rod is secured.

The structure already described is that which I contemplate utilizing particularly with a two-cycle engine. It is to be understood that it is also adapted for use with a four-cycle engine, the only modification required, being in respect to the valve-operating mechanism and, also, the upper portion of the cylinders. In lieu of the forms of valve-operating mechanisms already described, I prefer to employ that which is shown in Fig. 6, which includes a pinion 130

83 fast on the crank-shaft, a second pinion 84 fast on a stub-shaft 85 journaled in a bracket 86 secured to any suitable part of the engine. As will be seen, the pinion 84 is relatively larger than the pinion 83 in order to produce a slower operation of the valve, as is usual in four-cycle engines in relation to the operation of the crank-shaft. Fast on the stub-shaft 85 is a cam-element 87. In some instances, the shaft would carry one of these cams at each of its ends. Adapted to traverse the active portions of said cam is a roller 88 mounted on the lower end of a lever 89 pivoted at 90, and which is provided with one or more holes 89ª in one or another of which is attached a valve-connecting rod 91. The second modification of the cylinder, as aforementioned, merely contemplates the provision of an additional port 92 opening into the ignition chamber and in which port operates a valve 93 of a form similar to that marked 52, Fig. 6. This valve is for the purpose of preventing the production of a vacuum which would be caused by the down-stroke of the piston which, in the four-cycle type of engine, would correspond to the suction-stroke, and which vacuum would, in my type of engine, be produced because, during the down-stroke of the piston, the inlet-valve is closed.

This form of valve-operating mechanism and the valve which it controls is also well adapted for use in the ordinary four-cycle type of engine. It would be desirable, however, if used therein to divide the crank-case into independent compartments resembling those shown in Fig. 2, so that air may be compressed therein for use in the carbureter and also for accelerating the return of the piston. In this connection, I may also state that the form of carbureter herein disclosed may also be effectually used in connection with the ordinary form of four-cycle engine.

Cycles of operation.

Assuming that the motor is of the two-cycle form and that it comprises three cylinders, (such as shown in the drawings) and assuming, also, that a rich mixture has passed through the carbureter-chamber 59 and conduit 28 into the firing-chamber, the igniting device is brought into operation to ignite the charge. This actuates the piston to produce a work-stroke thereof.

During such a work-stroke, the air port-valve 52, Fig. 6, closes and the air in chamber 12 is compressed, whereupon a certain portion of the air flows to the carbureter to coöperate with the gasolene flowing thereinto to make the mixture, and in which carbureter this mixture is held momentarily under reasonably safe compression, to ripen and be released at the proper time. Near the end of the work-stroke, the valve-mechanism (including disk 41, cam-groove 48, lever 45, and its connection) operates to open the exhaust-valve for releasing any residual gases or unexpended energy from the ignition chamber. Immediately following the opening of the exhaust, the air-ports 49 and 50 are opened by the piston as it reaches the end of its work-stroke; whereupon compressed air (from chamber 12) flows into the firing-chamber and forces out the burned gases, and assists in cooling the interior of the cylinder and thus clearing the same for a new mixture. As the piston rises in its up-stroke, the fresh air ports are again closed thereby. Any air remaining in the crank-case will, by reason of being compressed (and the air-ports being closed) give the piston a slight acceleration, after which a vacuum is created in the crank-case and more air is caused to flow into it through the air-port 52. During a considerable part of this suction-operation, under the piston, the exhaust-port will be open; but, when the crank is in the vicinity of 45° of upper dead-center, the exhaust-valve 94 commences to close and, simultaneously, the inlet-valve 95 commences to open, and will remain open while the crank is passing through 15° to 25°, more or less; whereupon the piston will cover the inlet and exhaust-ports, after which the inlet-valve operating-mechanism operates to close the inlet-port. Through the last or remaining degrees of movement of the crank, there is a slight compression of the mixture in the firing-chamber; and, during that period of compression, or later, the mixture can be ignited. Thus, it can be seen that I have obtained, in a two-cycle engine, the equivalent of the full work-suction - compression and exhaust-strokes of a four-cycle motor; and, with the novel systems of scavenging, cooling, etc., etc., already described, the results will be superior in every particular.

In Fig. 14, I have shown, diagrammatically, the various functions performed, as just described, during one complete revolution of the crank in a single cylinder of a motor of the two-cycle type. Therein is noted the successive operations of sparking, compression, admission of mixture, etc., and, also, the rate of speed of the piston in its down and up strokes.

It is to be understood that the cranks in the three cylinders, shown in Figs. 1–3, are arranged on the shaft in a relation of 120°, so that before one cylinder begins to exhaust, another is sending the piston on its work-stroke and this gives perfect mechanical balance.

In the diagrammatic view, Fig. 15, I have illustrated the resulting overlapping of the "power-stream," that is, the available developed force or energy thus making a continuous stream of power and reducing vibrations to the minimum. It will be understood that "A" in this figure designates one cylinder, "B" the central cylinder, and "C" that at the opposite end. In this figure is represented the power stroke of three pistons during a single complete revolution of the crank-shaft, on which the cranks are set at approximately 120°. As one cylinder is about to exhaust its contents, those of another are ignited, while, in the third cylinder, the gases are being exhausted preparatory to the admission of the new mixture.

It is rather generally admitted by those familiar with the art, that two-cycle motors are for the most part unsatisfactory, and for the following reasons: (1). Because, while running at high speed, and even without a muffler, the speed varies, fuel is wasted, and they are difficult to throttle down. (2). They miss fire, back-fire, and frequently because of leakage around the piston into the crank-case, or because the inlet-port is opened practically simultaneously with the exhaust-port, the new charge is ignited and explosions occur in the crank-case, thus racking and almost stopping the motor, all of which necessitates heavy construction. (3). They cannot develop full or steady power because of the above reasons and also because of the fact that, as they exhaust too quickly—resulting in a large portion of the burned gas being left in the ignition-chamber which contaminates the new mixture—the explosion force is greatly weakened, so that the full force of the work-stroke is not possible, and as the gases are removed too soon, the force developed by the explosion is dissipated before the piston has made two-thirds of its work-stroke.

One of the objects of my invention is to overcome these and other recognized defects and to produce a motor of the two-cycle type well adapted not only for vessels, but, for factory, aeroplane and automobile use.

The principal criticisms against the ordinary four-cycle motor are, that they are of too great size and weight, they include a multiplicity of parts, they embody imperfect valves, and they effect premature ignition due to overheated cylinder, high compression, etc., during the compression-stroke.

It will be obvious that my invention overcomes these defects.

What I claim is:

1. In an internal combustion engine, the combination of a cylinder provided with ports adjacent its top, a reciprocating piston working therein, an ignition-chamber formed at one side of said piston, a compression-chamber disposed at the opposite side of said piston, a crank-shaft operating in the compression-chamber, valves for controlling said ports, valve-operating mechanism connecting with said valves and the crank-shaft and actuatable thereby in a plurality of directions to effect a positive movement of the valves in opposite directions, and a carbureter communicating with said ignition chamber and with said compression-chamber.

2. In an internal combustion engine, the combination of a cylinder provided with ports adjacent its top, a reciprocating piston working therein, an ignition-chamber formed at one side of said piston, a compression-chamber disposed at the opposite side of said piston, a crank-shaft operating in the compression-chamber, valves for controlling said ports, valve-operating mechanism connecting with said valves and the crank-shaft and actuatable thereby in a plurality of directions to effect a positive movement of the valves in opposite directions, a carbureter communicating with said ignition-chamber and with said compression-chamber, and valve-mechanism for controlling communication between said carbureter and said compression chamber.

3. In an internal combustion engine, a cylinder provided with a set of valve-controlled inlet and exhaust ports at one end and a set of ports at the opposite end, and a piston within the cylinder and movable to cover each set of ports in succession.

4. In an internal combustion engine, a cylinder provided with a compression chamber at one end and a firing chamber at the other end, a piston within the cylinder, valve-controlled ports in the firing chamber at one end thereof, and ports in the compression chamber opening into the firing chamber at the other end thereof, the piston operating to cover the different ports at predetermined times, and positively actuated means to close the valve controlled ports when covered and open them when uncovered by said piston.

5. An engine comprising a cylinder, a piston mounted for movement therein; said cylinder being provided with an inlet and with an exhaust port opening into one end thereof and provided at its opposite end with an opening for the admission of a scavenging medium; valve mechanism for positively controlling the inlet and exhaust ports; and means for effecting operation of the valves after the piston has covered or uncovered the port openings in the cylinder.

6. An engine comprising a cylinder, a piston mounted for movement therein; said cylinder being provided with an inlet and exhaust port opening into one end thereof and with an opening for a scavenging medium disposed in its opposite end; a compression chamber in communication with said opening for said scavenging medium; means effecting a communication between said compression chamber and said inlet port; a carbureter included in said means; means for retaining a portion of said scavenging medium under compression in said carbureter during a portion of the stroke of said piston; and independent means for opening communication between the inlet port and the interior of the cylinder after the piston has uncovered the inlet opening.

7. An engine comprising a cylinder, a piston mounted for movement therein; said cylinder being provided with an inlet and exhaust port opening into one end thereof and with an opening for a scavenging medium disposed in its opposite end; a compression chamber in communication with said opening for said scavenging medium; means effecting a communication between said compression chamber and said inlet port; a carbureter included in said means; means for retaining a portion of said scavenging medium under compression in said carbureter during a portion of the stroke of said piston; means for opening communication between the inlet port and the interior of the cylinder after the piston has uncovered the inlet opening; and independent means for opening the exhaust port valve after the piston has uncovered said exhaust port opening.

8. An internal combustion engine comprising a three-cylinder two-cycle motor, each cylinder having a firing chamber and a compression chamber; said firing chamber being provided with an inlet and exhaust port opening into one end thereof and with a communication between said compression chamber and said firing chamber opening into the outer end thereof; valve mechanism for positively opening and closing said inlet and exhaust ports; a crank shaft, a connection between each piston and said crank shaft, each connection being at approximately an angle of 120 degrees in relation to the next preceding connection; each piston being operable to uncover the communication between the compression chamber and firing chamber at the limit of its movement in one direction and at the limit of its movement in its opposite direction to cover said inlet and exhaust openings; and means connected with said crank shaft for operating the valves in the inlet and exhaust ports after the piston has covered or uncovered the inlet and exhaust port openings.

In testimony whereof I affix my signature in presence of two witnesses.

GEORGE W. DONNING.

Witnesses:
ALVAH D. MEAD,
PERCY E. CANTRELL.